April 13, 1943.  F. SCHUSTER  2,316,630
COLLECTING DEVICE
Filed Oct. 30, 1940  2 Sheets-Sheet 1

Inventor:
Fritz Schuster
by Singer, Ehlert, Stern
& Careberg
Attys.

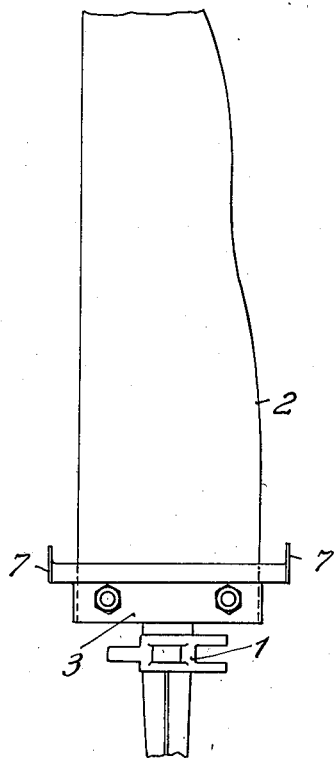
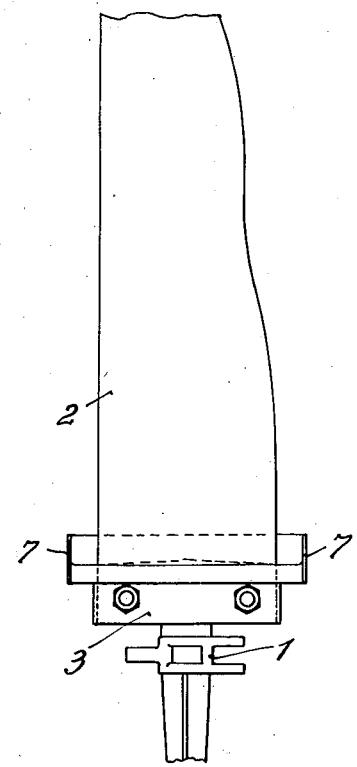
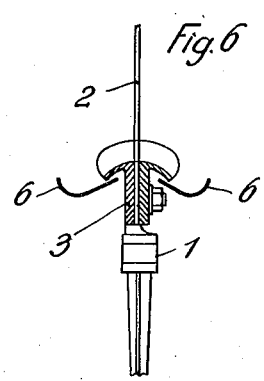
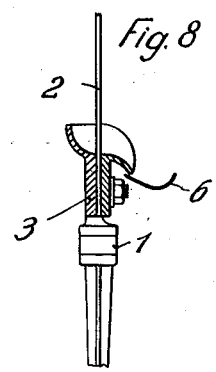

Patented Apr. 13, 1943

2,316,630

UNITED STATES PATENT OFFICE 2,316,630

COLLECTING DEVICE

Fritz Schuster, Chemnitz, Germany; vested in the Alien Property Custodian

Application October 30, 1940, Serial No. 363,585
In Germany November 21, 1939

5 Claims. (Cl. 91—18)

This invention relates to a device for collecting the treating liquid for hosiery arranged on vertical boards or forms.

In forming or finishing machines for stockings and socks these products are subjected to a moist treatment for various reasons. Depending on the object in view, the liquid used for such treatment may contain additions of chemicals or other substances adapted to produce the desired effect, the hosiery to be treated being stretched on forms usually vertically disposed, one after the other, on a form or conveying chain.

In treating this vertical row of forms by spraying or otherwise applying the liquid to both sides of a stocking, etc. spread on a form it is not possible to apportion the treating liquid in such an exact manner that the stocking can absorb all of the liquid. There will always be an excess of treating liquid which runs down on both sides of the stocking.

Attempts have of course been made to collect and reuse this excess liquid for the treatment of additional stockings, etc., since it may be expensive owing to the nature of the chemicals and other substances added thereto. It has been tried for instance to provide collecting troughs underneath the various forms, but this arrangement is open to several objections. In the first place, the excess liquid, before reaching the trough, passes from the form to the form support and the chain, so that it becomes soiled and has to be purified prior to further use. The requisite additional equipment is, however, uneconomical and renders the plant complex. Furthermore, the hosiery may be successively treated with different kinds of liquid, and if the excess liquid is collected in the manner indicated, the particles of liquid adhering to the form supports and the chain will unavoidably get mixed, which is of course undesirable.

It is the object of the invention to collect the excess liquid in a very simple and economical manner and to prevent mixing of successively applied treating liquids by arranging a collecting device directly under each form.

Figure 1:
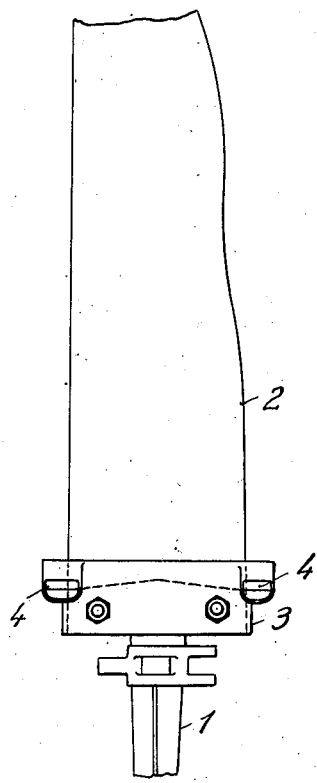
Figure 3:
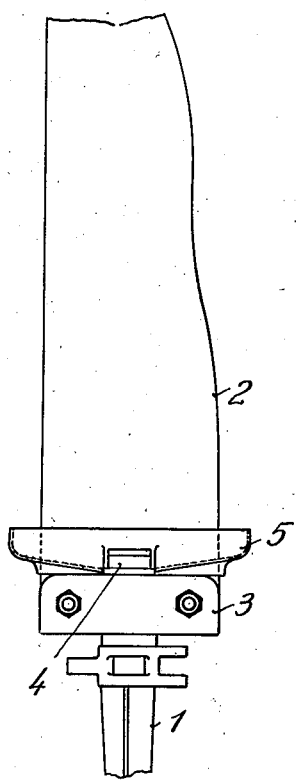
Figure 2:
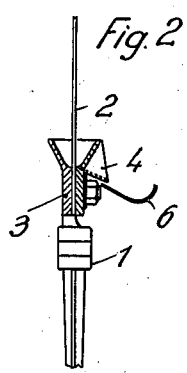
Figure 4:
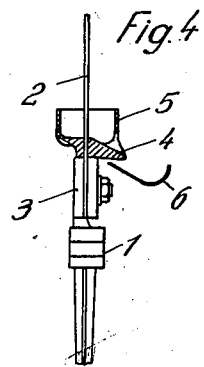

The collecting device according to the invention can be constructed in various ways, four embodiments of the invention, which have been practically tested and given good satisfaction, being described below with reference to the accompanying drawing, in which Figures 1 to 8 show each two different views of these four constructional embodiments.

1 indicates a chain or other traveling support symbolically represented by a single link and carrying a support 3 on which a form 2 is vertically disposed which receives a stocking etc. for treatment.

In the construction shown in Figs. 1, 2, 5, 6, 7 and 8 the form supports 3 are themselves constructed so as to form collecting vessels. In the constructions shown in Figs. 3 and 4 the collecting device forms a collar 5 above the support 3. In every instance, the collecting device is provided directly underneath the form 2, and excess liquid is therefore effectively prevented from being splashed upon the support 3 and the links 1 of the chain prior to reaching the collecting device. There will thus be no soiling or mixing of different treating liquids, since the liquid collected after each treatment can be discharged without trouble.

For this purpose, the collecting vessels shown in Figs. 1, 2, 3 and 4 are fitted with a spout 4. As indicated in Figs. 2, 4, 6 and 8, the collected liquid can be returned for further use by means of the channels 6, or in any other suitable manner.

Figs. 5 and 6 show an umbrella-like construction of the collecting vessel, so that the liquid collected immediately passes toward both sides into the channels 6. The protective walls 7 prevent splashing of the liquid in other directions.

Figs. 7 and 8 show a similar construction in which the liquid discharges into the channel 6 on one side only.

These constructions may also be used as attachable collars.

The invention is of course applicable also to single forms.

I claim:

1. In a hosiery treating device of the character described, a traveling support, a hosiery form extending upwardly from said support, and a vessel attached rigidly to the lower end of said form for collecting excess treatment liquid which drains from the article on said form, said vessel being provided with at least one discharge spout which directs the collected liquid away from said support.

2. In a hosiery treating device of the character described, a traveling support, a hosiery form extending upwardly from said support, and a vessel attached to the lower end of said form and integral with the upper portion of said support for collecting excess treatment liquid which drains from the article on said form, said vessel being provided with at least one discharge spout which directs the collected liquid away from said support.

3. In a hosiery treating device of the character described, a traveling support, a hosiery form extending upwardly from said support, and a vessel surrounding the lower end of said form and mounted on top of said support for collecting excess treatment liquid which drains from the article on said form, said vessel being provided with at least one discharge spout which directs the collected liquid away from said support.

4. In a hosiery treating device of the character described, a traveling support, a hosiery form extending upwardly from said support, a vessel attached rigidly to the lower end of said form for collecting excess treatment liquid which drains from the article on said form, said vessel being provided with at least one discharge spout, and a stationary trough adjacent one side of said movable support for receiving the liquid discharged by said spout.

5. In a hosiery treating device of the character described, a traveling support, a hosiery form extending upwardly from said support, a vessel surrounding the lower end of said form and mounted on top of said support for collecting excess treatment liquid which drains from the article on said form, said vessel being provided with at least one discharge spout, and a stationary trough adjacent one side of said movable support for receiving the liquid discharged by said spout.

FRITZ SCHUSTER.